US 6,474,627 B2

(12) United States Patent
Speece (10) Patent No.: US 6,474,627 B2
(45) Date of Patent: Nov. 5, 2002

(54) GAS DISSOLVING APPARATUS AND METHOD (75) Inventor: Richard E. Speece, Nashville, TN (US)

(73) Assignee: Eco-Oxygen Technologies, LLC, Indianapolis, IN (US)

(*) Notice: Subject to any disclaimer, the term of this patent is extended or adjusted under 35 U.S.C. 154(b) by 0 days.

(21) Appl. No.: 10/041,428

(22) Filed: Oct. 26, 2001

(65) Prior Publication Data
US 2002/0105100 A1 Aug. 8, 2002

Related U.S. Application Data (62) Division of application No. 09/677,369, filed on Oct. 2, 2000, now Pat. No. 6,322,055.

(51) Int. Cl.⁷ .................................................. B01F 3/04
(52) U.S. Cl. ........................ 261/77; 261/79.2; 261/123; 95/204; 95/219; 95/261; 96/301
(58) Field of Search ........................ 261/77, 79.2, 123; 995/185, 204, 219, 221, 261; 96/216, 301, 355, 358

(56) References Cited

U.S. PATENT DOCUMENTS

| 3,617,537 A | 11/1971 | Vermette | 210/8 |
| 3,643,403 A | 2/1972 | Speece | 55/53 |
| 3,677,936 A | 7/1972 | Bastiaanse | 210/15 |
| 3,737,382 A | 6/1973 | Fletcher et al. | 210/12 |
| 3,738,620 A | 6/1973 | Ennis | 261/6 |
| 3,756,197 A | 9/1973 | Buss et al. | 119/3 |
| 3,758,083 A | 9/1973 | Palmer | 261/25 |
| 3,772,187 A | 11/1973 | Othmer | 210/7 |
| 3,778,233 A | 12/1973 | Blough et al. | 23/259.1 |
| 3,779,913 A | 12/1973 | Martin | 210/63 |
| 3,794,303 A | * 2/1974 | Hirshon | 261/77 |
| 3,804,255 A | 4/1974 | Speece | 210/194 |

(List continued on next page.)

Primary Examiner—C. Scott Bushey
(74) Attorney, Agent, or Firm—Doreen J. Gridley; Rachel L. St. Peter; Ice Miller (57) ABSTRACT A method and apparatus for dissolving a gas into a fluid which may contain at least one dissolved gas. The apparatus includes a conventional U-tube oxygenator which includes a U-tube member having an inlet for the introduction of the fluid and the gas to be dissolved into the fluid, and an outlet. The fluid is housed in the U-tube member. The apparatus further includes a helix-shaped bubble harvestor located proximate the bottom of the inlet side of the U-tube member. The helix-shaped bubble harvester removes fugitive (undissolved) gas bubbles from the fluid flow and returns them to the bubble swarm located above the helix-shaped bubble harvestor. The resulting fluid, which contains a high concentration of dissolved gas, exits the outlet of the U-tube member.

9 Claims, 6 Drawing Sheets

U.S. PATENT DOCUMENTS

| | | | |
|---|---|---|---|
| 3,815,879 A | 6/1974 | Mikhailov et al. ............ 261/93 |
| 3,840,457 A | 10/1974 | Wilson ........................ 210/14 |
| 3,926,588 A | 12/1975 | Speece ........................ 55/52 |
| 3,927,152 A | 12/1975 | Kyrias ........................ 261/122 |
| 3,947,359 A | 3/1976 | Laurie .................... 210/221 P |
| 3,953,554 A | 4/1976 | Loughridge ................ 261/124 |
| 3,956,124 A | 5/1976 | Fast et al. .................. 210/63 R |
| 3,981,273 A | 9/1976 | Buss ............................. 119/3 |
| 3,984,323 A | 10/1976 | Evens ........................ 210/220 |
| 3,992,491 A | 11/1976 | Ihrig et al. ................... 261/87 |
| 4,044,720 A | 8/1977 | Fast .............................. 119/3 |
| 4,048,072 A | 9/1977 | McCullough .............. 210/220 |
| 4,064,750 A | 12/1977 | Speece ..................... 73/194 R |
| 4,087,262 A | 5/1978 | Speece ........................ 55/52 |
| 4,094,774 A | 6/1978 | Smith .......................... 210/12 |
| 4,102,650 A | 7/1978 | Spevack ................. 23/270.5 W |
| 4,126,544 A | 11/1978 | Baensch ...................... 210/11 |
| 4,133,850 A | 1/1979 | Hauser ........................ 261/93 |
| 4,146,478 A | 3/1979 | Rongved ................ 210/195 S |
| 4,157,304 A | 6/1979 | Molvar ....................... 210/220 |
| 4,171,263 A | 10/1979 | Roberts, Jr. et al. ............ 210/8 |
| 4,179,375 A | 12/1979 | Smith ........................ 210/197 |
| 4,203,841 A | 5/1980 | Shimizu et al. ............. 210/205 |
| 4,210,534 A | 7/1980 | Molvar ....................... 210/220 |
| 4,213,923 A | 7/1980 | Bryson ....................... 261/120 |
| 4,224,158 A | 9/1980 | Molvar ....................... 210/220 |
| 4,226,717 A | 10/1980 | Malm ....................... 210/195.1 |
| 4,226,719 A | 10/1980 | Woltman ................... 210/220 |
| 4,235,719 A | 11/1980 | Pearson .................. 210/195.1 |
| 4,244,821 A | 1/1981 | Molvar ....................... 210/220 |
| 4,248,707 A | 2/1981 | Granger ..................... 210/695 |
| 4,251,365 A | 2/1981 | Speece ................. 2361/121 R |
| 4,278,546 A * | 7/1981 | Roesler ........................ 261/77 |
| 4,287,070 A * | 9/1981 | Pollock ........................ 261/77 |
| 4,304,665 A * | 12/1981 | Hines ........................ 261/77 |
| 4,347,143 A | 8/1982 | Righetti ..................... 210/758 |
| 4,350,589 A | 9/1982 | Stog ........................ 210/220 |
| 4,351,730 A * | 9/1982 | Bailey et al. ................. 261/77 |
| 4,368,121 A | 1/1983 | Vasiliev et al. ............. 210/170 |
| 4,415,508 A | 11/1983 | Aida et al. ............... 261/114 R |
| 4,421,648 A | 12/1983 | Besik ........................ 210/605 |
| 4,474,713 A | 10/1984 | Wickoren ................... 261/108 |
| 4,504,388 A | 3/1985 | Desbos et al. ............. 210/150 |
| 4,545,945 A | 10/1985 | Prave et al. .............. 261/36 R |
| 4,581,137 A | 4/1986 | Edwards et al. ............ 210/220 |
| 4,587,064 A | 5/1986 | Blum .......................... 261/37 |
| 4,659,485 A | 4/1987 | Arbisi et al. ................ 210/758 |
| 4,690,756 A | 9/1987 | Van Ry ................... 210/221.2 |
| 4,695,378 A | 9/1987 | Ackman et al. ......... 210/198.1 |
| 4,704,204 A | 11/1987 | Kaelin ....................... 210/219 |
| 4,724,086 A | 2/1988 | Kortmann ................... 210/747 |
| 4,732,682 A | 3/1988 | Rymal ....................... 210/620 |
| 4,749,493 A | 6/1988 | Hicks ........................ 210/617 |
| 4,749,527 A | 6/1988 | Rasmusen .................... 261/76 |
| 4,786,419 A | 11/1988 | Mouratoglu et al. ........ 210/747 |
| 4,793,919 A | 12/1988 | McCorquodale ............ 210/177 |
| 4,820,412 A | 4/1989 | Meyer-Rudolphi et al. . 210/220 |
| 4,857,350 A | 8/1989 | Iwasaki et al. ............. 426/506 |
| 4,863,643 A | 9/1989 | Cochran ...................... 261/76 |
| 4,863,644 A | 9/1989 | Harrington et al. ........... 261/77 |
| 4,867,918 A | 9/1989 | Kiyonara et al. ............. 261/76 |
| 4,885,084 A | 12/1989 | Doyle ........................ 210/132 |
| 4,906,359 A | 3/1990 | Cox, Jr. ..................... 210/170 |
| 4,911,838 A | 3/1990 | Tanaka .................... 210/221.2 |
| 4,911,849 A | 3/1990 | Labesque et al. ........... 210/747 |
| 4,931,225 A | 6/1990 | Cheng ......................... 261/76 |
| 4,956,080 A | 9/1990 | Josefik ....................... 210/109 |
| 4,961,400 A | 10/1990 | Lapray .......................... 119/3 |
| 5,013,429 A | 5/1991 | Krofta ........................ 210/137 |
| 5,045,202 A | 9/1991 | Stearns et al. .............. 210/628 |
| 5,057,230 A | 10/1991 | Race .......................... 210/758 |
| 5,080,802 A | 1/1992 | Cairo, Jr. et al. ........... 210/703 |
| 5,084,167 A | 1/1992 | Beard et al. ................. 210/194 |
| 5,087,377 A | 2/1992 | Josefik ....................... 210/703 |
| 5,110,741 A | 5/1992 | Ohi et al. .................... 435/284 |
| 5,116,501 A | 5/1992 | House ..................... 210/242.2 |
| 5,116,506 A | 5/1992 | Williamson et al. ......... 210/610 |
| 5,118,415 A | 6/1992 | Weis et al. .................. 210/194 |
| 5,133,876 A | 7/1992 | Tharp ........................ 210/758 |
| 5,152,888 A | 10/1992 | Koyama .................. 210/195.3 |
| 5,160,459 A | 11/1992 | Guarnaschelli et al. ........ 261/92 |
| 5,167,806 A | 12/1992 | Wang et al. ................ 210/188 |
| 5,167,878 A | 12/1992 | Arbisi et al. ................. 261/30 |
| 5,185,085 A | 2/1993 | Borgren ..................... 210/747 |
| 5,194,144 A | 3/1993 | Blough ........................ 210/85 |
| 5,200,080 A | 4/1993 | Bergman, Jr. et al. ....... 210/607 |
| 5,211,916 A | 5/1993 | Cheng ........................ 422/107 |
| 5,256,282 A | 10/1993 | Chang et al. ................ 210/615 |
| 5,262,051 A | 11/1993 | Iwatsuka .................... 210/615 |
| 5,264,130 A | 11/1993 | Etlin ........................ 210/626 |
| 5,294,340 A | 3/1994 | Stog ........................ 210/610 |
| 5,302,286 A | 4/1994 | Semprini et al. ........... 210/610 |
| 5,314,621 A | 5/1994 | Rogalla ..................... 210/618 |
| 5,330,639 A | 7/1994 | Murphree ................... 210/170 |
| 5,352,369 A | 10/1994 | Heinig, Jr. ................. 210/760 |
| 5,356,600 A | 10/1994 | Kiyonaga et al. ........... 422/234 |
| 5,362,400 A | 11/1994 | Martinell .................... 210/717 |
| 5,380,471 A | 1/1995 | Ban et al. ................. 261/122.1 |
| 5,391,328 A | 2/1995 | Ott et al. ................... 261/36.1 |
| 5,403,522 A | 4/1995 | Von Berg .................. 261/36.1 |
| 5,423,979 A | 6/1995 | Allen ........................ 210/168 |
| 5,437,784 A | 8/1995 | Meinecke et al. .......... 209/170 |
| 5,463,176 A | 10/1995 | Eckert ....................... 210/622 |
| 5,494,583 A | 2/1996 | Dieter ........................ 210/721 |
| 5,494,589 A | 2/1996 | Moorehead et al. ........ 210/760 |
| 5,496,505 A | 3/1996 | Walla et al. ................. 261/76 |
| 5,520,818 A | 5/1996 | Smith et al. ................ 210/703 |
| 5,525,242 A | 6/1996 | Kerecz ...................... 210/758 |
| 5,543,089 A | 8/1996 | Pichardo .................... 261/116 |
| 5,569,416 A | 10/1996 | Cross ........................ 261/37 |
| 5,580,463 A | 12/1996 | Hubred ...................... 210/703 |
| 5,590,551 A | 1/1997 | Hong .......................... 68/183 |
| 5,591,001 A | 1/1997 | Ray et al. ................... 415/111 |
| 5,595,691 A | 1/1997 | Hsu .......................... 261/120 |
| 5,624,565 A | 4/1997 | Lefevre et al. ............. 210/614 |
| 5,639,371 A | 6/1997 | Loy et al. ................... 210/614 |
| 5,662,837 A * | 9/1997 | Saito et al. ................... 261/77 |
| 5,741,443 A | 4/1998 | Gemza ....................... 261/77 |
| 5,772,886 A | 6/1998 | Bettle ........................ 210/605 |
| 5,783,118 A | 7/1998 | Kolaini ....................... 261/37 |
| 5,785,854 A | 7/1998 | McKinney ................. 210/620 |
| 5,814,222 A | 9/1998 | Zelenak et al. ............. 210/615 |
| 5,863,031 A | 1/1999 | Veeder et al. ............. 261/122.1 |
| 5,874,001 A | 2/1999 | Carter ....................... 210/610 |
| 5,876,639 A | 3/1999 | Campau .................... 261/36.1 |
| 5,885,466 A | 3/1999 | Kelly ........................ 210/750 |
| 5,904,851 A | 5/1999 | Taylor et al. ............... 210/620 |
| 5,935,490 A | 8/1999 | Archbold et al. ............. 261/76 |
| 5,948,326 A | 9/1999 | Pate .......................... 261/91 |
| 5,951,922 A | 9/1999 | Mazzei ..................... 261/36.1 |
| 5,968,352 A | 10/1999 | Ditzler ...................... 210/220 |
| 5,988,601 A | 11/1999 | Burgess ..................... 261/34.1 |
| 6,017,020 A | 1/2000 | Baughman et al. ......... 261/36.1 |
| 6,032,931 A | 3/2000 | Plunkett ..................... 261/77 |
| 6,033,576 A | 3/2000 | Russo ........................ 210/704 |
| 6,036,749 A | 3/2000 | Ribeiro et al. ................ 95/261 |
| 6,050,550 A | 4/2000 | Burgess ..................... 261/29 |
| 6,103,123 A * | 8/2000 | Gantzer ...................... 261/77 |
| 6,237,898 B1 * | 5/2001 | Lafont ....................... 261/123 |
| 6,254,667 B1 * | 7/2001 | Saito et al. ................... 261/77 |

* cited by examiner

GAS DISSOLVING APPARATUS AND METHOD

RELATED PATENT APPLICATION

This patent application is a divisional application of Ser. No. 09/677,369, now U.S. Pat. No. 6,322,055, entitled GAS DISSOLVING APPARATUS AND METHOD, filed on Oct. 2, 2000, and assigned to the same assignee as the present invention.

FIELD OF THE INVENTION

This invention relates to an apparatus and method for dissolving gas in a fluid, and, more particularly, to dissolving a gas into a fluid which may contain other dissolved gases.

BACKGROUND OF THE INVENTION

There are many instances when it is desirable to dissolve a gas, whether soluble or insoluble, into a fluid which may already contain other dissolved gases. For example, the macro and microbial organisms in all rivers, lakes, oceans, and all aerobic wastewater treatment processes are based on the presence of sufficient dissolved oxygen to sustain their life processes. Normally, in undisturbed bodies of water there is a rather low density of macro and micro organisms in the surface water and the limited natural absorption of oxygen from the air into the water is sufficient to maintain sufficient concentrations of dissolved oxygen in the water to sustain the life processes of that body of water. However, with increased population density and industrial activity, the associated organic water pollution causes a high microbial oxygen demand that natural oxygen aeration processes cannot begin to provide sufficient oxygen resources. Thus, artificial aeration mechanisms are required to enhance oxygen absorption.

Some specific examples of oxygenation applications are worthy of discussion. Odors at aerobic wastewater treatment facilities are associated with the inability to maintain sufficient levels of dissolved oxygen ("D.O."). In the absence of sufficient D.O., nitrates are reduced to $N_2$ gas. In the absence of both D.O. and nitrates, strongly reducing conditions develop and sulfates are reduced to $H_2S$, also known as "rotten egg gas". This process can occur in any aquatic system where the oxygen demand exceeds the D.O. supply.

The high organic pollution in municipal wastewater of sewer lift stations supports a corresponding high microbial population, which, in turn, requires a high rate of D.O. to meet the demand. If the demand is not met, $H_2S$ formation readily occurs. Consequently, sewer force mains are a common source of odor nuisance for municipal public works.

Some industries (pharmaceutical, petroleum, and chemical, for example) create significant air pollution problems in the course of aerobically treating their wastewater by the use of conventional aeration systems. The wastewaters contain significant volatile organics/solvents which are readily biodegradable if they can be retained in the aqueous phase for a sufficient time. The use of conventional aeration systems has led to the requirement that the wastewater aeration basins must be covered to capture and incinerate the off gas in order to comply with air emission regulations. The need for a covered basin arises because conventional aeration systems readily strip the organics/solvents from the aqueous phase, not allowing for a sufficient time to biograde in the liquid.

Aerobic activated sludge processes are dependent upon oxygen transfer and sludge settling and recycle in the secondary clarifiers. It is now possible to develop high concentrations of sludge concentrations within the reactors, such as with the use of aerobic fluidized beds and moving bed filters, to the point where oxygen transfer becomes the limiting factor. Specifically, high levels of D.O. are required without subjecting the sludge to high energy dissipation/turbulence conditions which could shear off the biofilms or hinder flocculent sedimentation in the secondary clarifiers.

Fish farming and shrimp production commonly occurs in large ponds. To maximize production, the ponds are operated at the edge of D.O. availability. Since a still pond absorbs very little oxygen, there exists a need for artificial aeration to sustain high levels of fish/shellfish production.

The desire to increase dissolved oxygen levels is also applicable to slow moving rivers (such as the Cuyahoga River flowing through Cleveland, Ohio, and the rivers in Bangkok and Taipei) and canals (such as the waterways of Chicago, Ill. and the canals of Amsterdam). Many industries must curtail production (to considerable economic detriment) due to insufficient D.O. in the rivers, streams, and canals to which they discharge their treated wastewaters. Odor and corrosion problems can also occur in the bottom layer of stratified lakes and reservoirs feeding hydroelectric power dams. The low D.O. levels also result in fish kills.

Systems for dissolving a gas into a fluid are not limited to dissolving oxygen in water. Other gas/fluid combinations include: hydrogenation of vegetable oils, coal liquification, yeast production, Vitamin C production, pharmaceutical and industrial aerobic bioprocesses, and other processes well known in the art.

Therefore, it is desired to provide an apparatus and method of dissolving a gas into a fluid possibly containing other dissolved gases that has application in at least the following situations:

Slow moving rivers and canals
Reservoirs
Fish, shrimp shellfish, and/or mussel ponds
Aerobic wastewater treatment systems
Sewer lift stations
Wastewater industries such as the pharmaceutical, petroleum, and chemical industries
Aerated lagoons
Hydrogenation of vegetable oils
Coal liquification
Yeast Production
Vitamin C product
Pharmaceutical and industrial aerobic bioprocesses
Ozonation of water or other fluids
Dissolving xenon in fluids for injecting into the body
Supersaturating eye-wash liquids with supersaturated D.O.

Conventional aeration systems either bubble air through diffusers in the bottom of the aeration tank or splash the water in contact with the air. These systems typically absorb 1 to 2 lbs. of oxygen per kilowatt hour of energy consumed. Oxygen absorption efficiency is generally not an issue with these systems because air is free. These systems are most efficient when the D.O. in the water is near zero and are progressively inefficient as the water D.O. level approaches saturation, i.e., 9.2 ppm at 20° C. at sea level. Because the oxygen used in the aeration process is from the air and therefore at no cost, the costs of such systems emanates from capital costs and operating costs. The capital cost of a surface aerator capable of dissolving one ton per day of D.O.

is about $40,000. The cost of power for the aerator is $70 to $140/ton of D.O. If the capital costs are amortized at 8% for a 10 year life, the total cost is approximately $87 to $157/ton of D.O.

In addition to costs, there are other disadvantages or shortcomings of conventional aeration systems. These shortcomings include: (a) low achievable D.O. concentrations of only 1 to 3 ppm; (b) high off-gas production; (c) high air stripping of volatile organic contaminants; (d) high energy dissipation in the reactor; (e) floc shear; and (f) limited D.O. supply potential.

As an alternative to conventional systems using "free" air to increase D.O. levels, systems now exist which generate or store oxygen on-site and dissolve this generated or stored oxygen into the water. Some of these systems are as economical as conventional aeration systems. Some of these systems address some of the shortcomings of conventional aeration systems. However, these systems have their own shortcomings.

For example, when high purity oxygen is being transferred into water, issues arise as to handling of dissolved nitrogen ("D.N.") already in the water. D.N. is not utilized in an aqueous environment. Air is primarily comprised of 21% oxygen and 79% nitrogen gas. When water is in contact with air for prolonged periods, the water is saturated with D.N. At 20° C., the saturation concentration of D.N. in water is 16 mg/L. With conventional aeration systems, D.N. levels remain in a steady state. However, when high purity oxygen is introduced into the water, it results in a reduced D.N. partial pressure which strips the D.N. from the dissolved phase into the gas phase where it, in turn, reduces the percentage oxygen composition. The reduction in percentage oxygen composition reduces the partial pressure of oxygen in the gas phase, and the saturation concentration of oxygen, and ultimately the rate of oxygen transfer.

Thus, the presence of D.N. in the incoming water presents is a trade-off situation. If high oxygen absorption efficiency is to be achieved, the increased nitrogen gas composition in the gas phase has to be accepted. This reduces the D.O. concentration which can be achieved in the discharge. Conversely, if high D.O. levels are to be achieved in the discharge, then the stripped nitrogen in the gas phase has to be wasted to reduce its percentage composition carrying with it a commensurate ratio of oxygen gas and reducing the percentage oxygen absorption efficiency.

Therefore, it is desirable to develop an oxygenation system which manages the level of D.N. already present in the water, and which reduces the concentration of D.N. to allow for higher potential D.O. saturation (total gas composition of $N_2+O_2=100\%$). Further, effervescent loss of highly saturated D.O. in the discharge should be prevented if the D.N. is reduced. Of course, these principles are applicable to dissolving a gas into a fluid containing dissolved gases other than dissolving oxygen in water (containing dissolved nitrogen).

Another problem associated with prior art systems is the ability of the systems to provide a protracted period of contact (generally preferred to be greater than 100 seconds) of the bubbles of oxygen (air) with the water. Prolonged contact of the bubbles helps to ensure a high oxygen absorption efficiency. Further, bubbles in the water should be controlled—the greater number of bubbles of oxygen, the greater the percentage oxygen absorption efficiency. Therefore, it is desired to provide an oxygenation system and method which fully utilizes the bubbles in the system and which prolongs the contact of those bubbles with the water to increase oxygen absorption efficiency of the apparatus.

With regard to the systems using oxygen rather than air, it is well known that high purity oxygen can be transported to the site in the form of liquid oxygen which is subsequently converted to gaseous oxygen for delivery to the oxygenator apparatus. Alternatively, on-site generation using cryogenic separation is feasible for oxygen requirements of 40 tons or more per day. Costs of liquid oxygen transported to the site fluctuates with the vagaries of site-specific conditions and the number of regional suppliers in competition, among other factors. Thus, in some instances, the cost of transported liquid oxygen may be prohibitive.

For oxygen generated using cryogenic systems, the oxygen can be produced in either the liquid or gaseous forms. If the oxygen is to be used at the same rate as it is produced, the gaseous state is preferred as it is less expensive to produce the gaseous form. However, if the generated oxygen is not used immediately, storage usually requires generation in the liquid state which significantly increases the costs associated with the generated oxygen, both as to production and due to the requirement for double-walled liquid oxygen storage tanks.

Another on-site production system is known as the pulsed swing absorption (PSA) process which utilizes pressure vessels filled with molecular sieves. A standard air compressor is used to feed the PSA device, and it generates oxygen with a 90% to 95% purity. The outlet pressure is related to the pressure of the air compressor which thus is the major cost factor in operating a PSA system. Therefore, it is desired to use the lowest possible PSA outlet pressure. In view of the available oxygen sources not based on "free" air, it is desirable to use PSA systems.

Oxygen dissolution into water is enhanced by increased pressure in the oxygen/water contactor (bubble swarm). However, the unit energy consumption is excessive if the water has to be pumped into the oxygen/water contactor, because there is no economical way to recover this energy when the water leaves the contactor. However, if the oxygen/water contactor is placed below the ground surface and pressurized by a static head of water, the water can be moved into and out of it with negligible energy—only frictional losses. Yet, the oxygen transfer is significantly enhanced without associated energy consumption for pumping to maintain the pressure.

Overall, it is desirable to provide an apparatus and method for dissolving a gas into a fluid which: (a) has a low capital cost; (b) has a low operating cost (kwhr/ton of gas dissolved); (c) discharges high D.O. concentrations; and (d) has a high oxygen absorption efficiency. Ideally, the system should be capable of producing a discharge D.O. of at least 30 mg/L and have an oxygen absorption efficiency of at least 80%, all accomplished with reasonable capital costs and a low unit operating cost.

SUMMARY OF THE INVENTION

The present invention is an apparatus and method for dissolving a gas (whether soluble or insoluble) into a fluid which may or may not contain other dissolved gases. For example, the present invention may be used as an oxygenation system, i.e., dissolving oxygen into water (water contains dissolved nitrogen).

In one embodiment, the apparatus comprises an inlet, an outlet, a bubble contact chamber, an acceleration device, a helix-shaped bubble harvester, and a bubble return pipe. The inlet receives the fluid containing the extraneous dissolved gas and is located at the top of the apparatus. Near the inlet and at the top of the bubble contact chamber is located the acceleration device for acceleration of the fluid therethrough into the chamber. The acceleration design may comprise a horizontally oriented plate extending through the entire upper end of the chamber and having at least one aperture therein. The chamber is made of two portions. The upper portion has either a constant or a generally diverging inside surface. The lower portion is substantially cylindrical in shape with a closed bottom end having at least one aperture therethrough. An inlet for introduction of the gas to be dissolved is connected to the chamber. The outlet is operatively connected to at least one aperture of the bottom end of the chamber. Residing in the bottom portion of the chamber is a helix-shaped bubble harvester. The bubble return pipe of the apparatus is vertically oriented and cylindrical in shape. The bubble return pipe has an open bottom end in the lower portion of the chamber, an open top end in the upper portion of the chamber, and at least one aperture located in the lower portion of the chamber proximate to the harvester.

During operation of this embodiment, fluid enters the inlet and flows through the acceleration device. The accelerated fluid provides turbulence to keep the bubble size small. Without this turbulence, the bubble swarm will coalesce and collapse, greatly reducing the oxygen absorption rate. The harvester translates the fluid flow into a horizontal component which allows the bubbles to rise and attach to the underside of the helix-shaped harvester. The bubbles then flow upward by gravity and inward due to centrifugal force in the helix. The bubbles flow into the bubble return pipe through at least one aperture in the tube and into the bubble chamber for recycling. Exiting out the outlet is a fluid containing a high concentration of dissolved gas and devoid of bubbles.

In another embodiment of the apparatus of the present invention, first and second vertical cylindrical tubes are concentrically oriented, with the first tube inside the second tube. The space inside the first tube is the first inner space and is the space through which fluid containing dissolved gas exits upward out of the apparatus. The second inner space is the space between the first and second tubes and is the space through which fluid and the dissolved gas enter the apparatus.

Two alternatives of this invention are disclosed. In one alternative, the combination of an acceleration device, an inlet, a helix-shaped bubble harvester, and a bubble return tube are placed near the bottom of the apparatus. This combination is referred to as the gas dissolver, and operates similarly to the previously described embodiment. Briefly, fluid flows through the acceleration device in the second inner space. The gas is introduced to the second inner space immediately below the acceleration device to result in bubbles and fluid flowing downward within the second inner space. At the harvester, bubbles are returned to the second inner space. The fluid having dissolved gas exits upward through the first inner space.

In a second alternative, the combination of an acceleration device, a harvester, and a bubble return tube are placed near the top of the apparatus. This combination is referred to as the dissolved gas stripper. The apparatus also includes a means for receiving waste gas from the oxygen gas absorber in the bottom of the apparatus, including a first vent located near the gas dissolver, waste gas tube, and a second vent located above the second harvester. Waste gas (gas from a gas dissolved in the fluid initially but later displaced by the dissolved gas) exits from the gas dissolved through the first vent and the waste gas tube into the bubble tube of the dissolved gas stripper. At the dissolved gas stripper, waste gas exits the apparatus through the second vent.

The dissolved gas stripper function is enhanced by the low pressure in the bubbles swarm at the top of the apparatus, while the oxygen absorber function is enhanced by the increased hydrostatic head at the bottom of the apparatus.

In yet another embodiment of the apparatus of the present invention, the harvester and bubble return pipe are placed near the bottom of the inlet side of a U-tube oxygenator. The use of the harvester and return pipe results in more efficient transfer. Thus, this modified. U-tube oxygenator need not be as deep as a conventional U-tube oxygenator.

The apparatus and method of the present invention is inexpensive to produce, install, maintain, and operate when compared to many systems used for oxygenation, for example. The apparatus and method may be used to dissolve a gas into a fluid which may or may not contain other dissolved gases. It has application where oxygenation is required, such as in slow moving rivers and canals, reservoirs, fish/shellfish/mussel ponds, aerobic wastewater treatment systems, sewer lift stations, wastewater industrial applications, lagoons, and more. It is also not limited to oxygenation of water, but is applicable for other gas dissolving applications.

The present invention is also highly efficient in absorption of the gas into the fluid. When the embodiment including a stripper is used, this efficiency is further increased. The apparatus may be used for fluid applications as well as when hydrostatic pressure is available, such as at the beginning of sewer force mains.

DETAILED DESCRIPTION OF THE INVENTION

Figure 1:
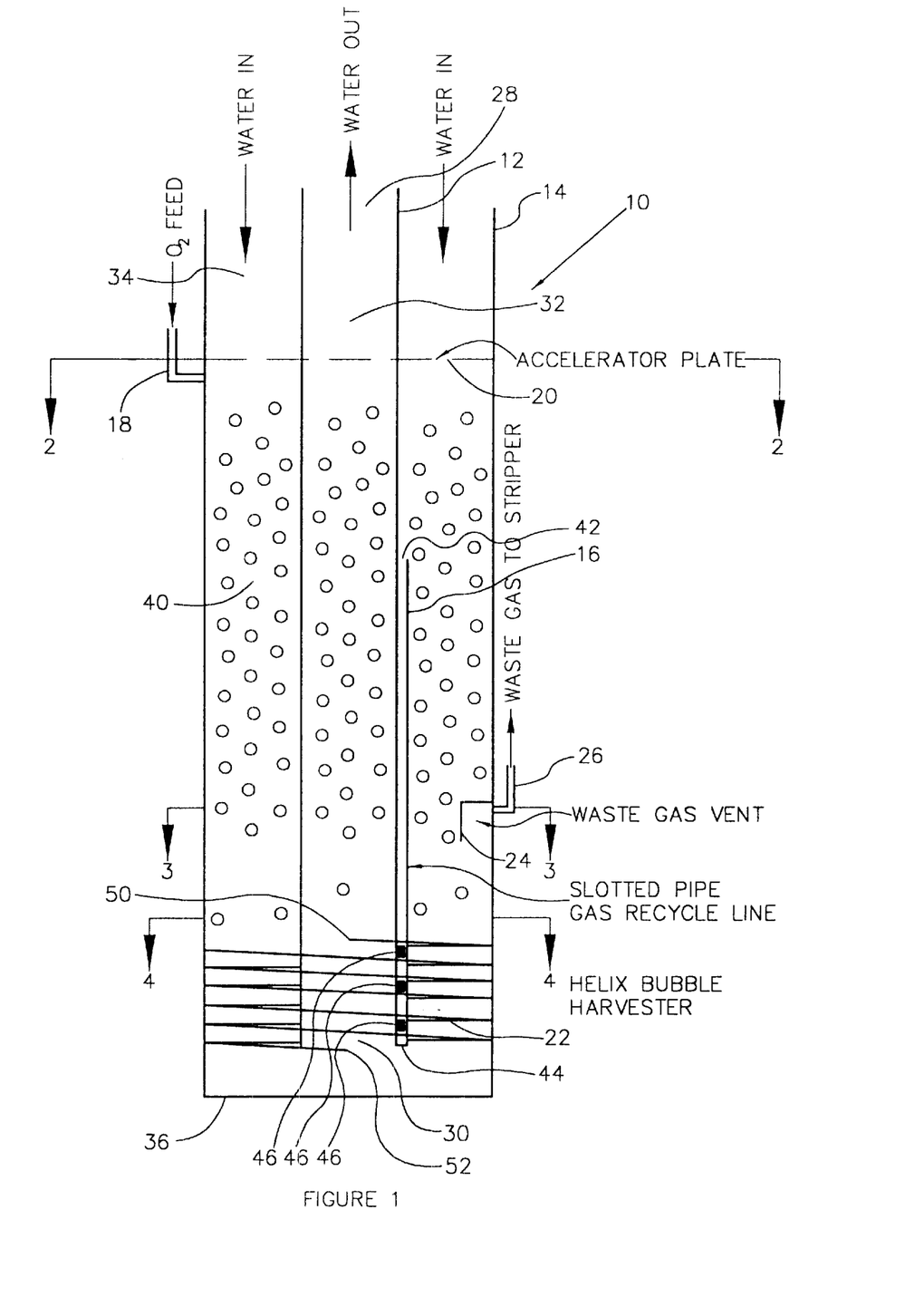
FIG. 1 shows a side view of one embodiment of the apparatus of the present invention in which the outer tube member is translucent to illustrate the components of the apparatus.

Referring now to FIG. 1, there is shown a side view of one embodiment of the apparatus of the present invention in which the outer tube member is translucent to illustrate the components of the apparatus. In this embodiment, apparatus 10 is used to oxygenate water. Because water contains dissolved nitrogen which is displaced by the dissolved oxygen, apparatus 10 also permits for outgassing (stripping) of nitrogen gas.

Apparatus 10 includes first tube member 12, second tube member 14, third tube member 16, gas feed inlet 18, accelerator plate 20, bubble harvester 22, waste gas vent 24, and waste gas tube 26. Both the upper end 28 and the bottom end 30 of first tube 62 are open. The interior of first tube 12 between upper end 28 and bottom end 30 defines first inner space 32. First tube member 12 is oriented in a substantially vertical orientation and is comprised of a material impervious to the passage of fluid therethrough. If the fluid comprises water, for example, first tube 12 may be comprised of plastic or metal. The material of first tube 12 should also be resistant to corrosion caused by the fluid.

Apparatus 10 also includes second tube member 14 oriented in a substantially vertical orientation. Second tube member is of a diameter greater than the diameter of first tube member 12 and is oriented in a substantial concentric orientation relative to the first tube member 12. Second tube member 14 has open upper end 34 and closed bottom end 36. The space between the outside of first tube member 12 and the inside of second tube member 14 is second inner space 40. Second tube member 14 should also be impervious to the flow of the fluid therethrough and it is preferred that it be resistant to corrosion caused by the fluid. Second tube member 14 should also be made of a material impervious to the flow of any material on the outside of second tube member 14 and is preferred to be resistant to corrosion caused by such material. First and second tube members 12 and 14 may be comprised of a similar material, but this is not required.

Third tube member 16 has open upper end 42 and open bottom end 44, is cylindrical in shape, and also substantially vertically oriented within second inner space 40. Bottom end 44 is on the place formed by bottom end 30 of first tube member 12. Upper end 42 is within second inner space 40 above bubble harvester 22, waste gas vent 24 and waste gas tube 26, and below accelerator plate 20 and inlet 18. Third tube member 16 also includes at least one aperture or slot 46 proximate harvester 22. Third tube member 16 should be comprised of a material impervious to the flow of fluid or the waste gas therethrough. Thus, third tube member 16 may be comprised of the same material as first tube member 12 and/or second tube member 14, but this is not required.

Figure 3:
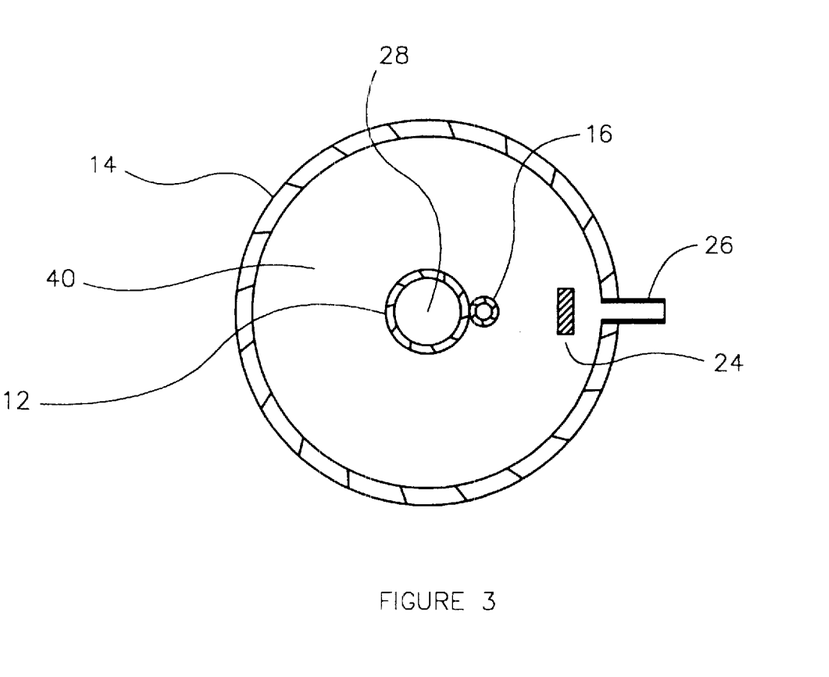
FIG. 3 shows a cross-sectioned view of the apparatus of FIG. 1 at line 3—3 of FIG. 1.
Figure 4:
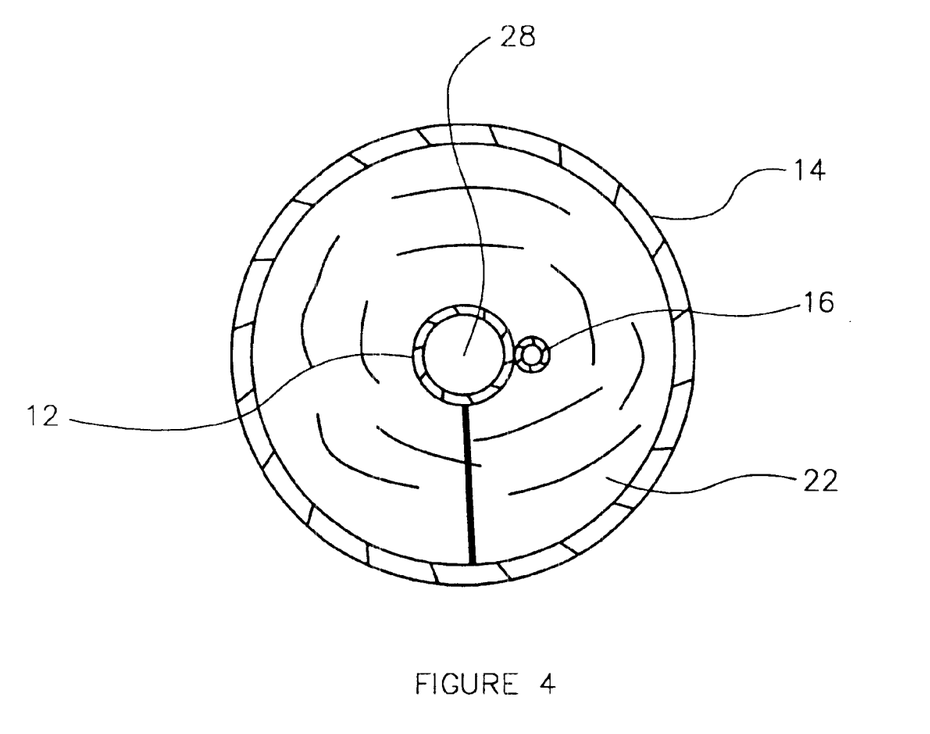
FIG. 4 shows a cross-sectioned view of the apparatus of FIG. 1 at line 4—4 of FIG. 1.

In the embodiment of FIG. 1, third tube member 16 is shown to lie against first tube member 12 (see also FIGS. 3 and 4). It is required that third tube member reside within second inner space 40, as explained in greater detail below. It is not required that third tube member 16 be in contact with first tube member 12 as shown; however, as will be explained hereinafter, it is advantageous to place third tube member 16 closer to the central longitudinal axis of first tube member 12 and of apparatus 10 and, more specifically, close to the central axis of helix-shaped harvester 22.

Returning now to FIG. 1, apparatus 10 also includes inlet 18, serving as an inlet means for introduction of the gas (in this illustration oxygen) to be dissolved into the fluid housed in second inner space 40. The gas may be pumped into inlet 18 by means well known in the art for introduction of the gas into second inner space 40 through second tube member 14.

Figure 2:
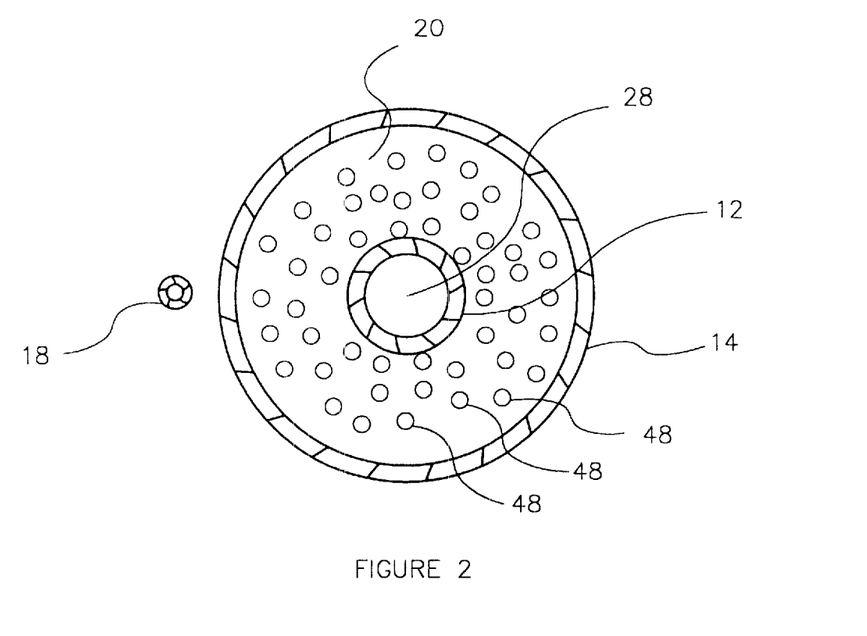
FIG. 2 shows a cross-sectional view of the apparatus of FIG. 1 at line 2—2 of FIG. 1.

Apparatus 10 further comprises accelerator plate 20. Accelerator plate 20 serves as a means to accelerate the flow of fluid therethrough. As shown in FIG. 2, a cross-sectional view along line 2—2 of FIG. 1, in this embodiment, accelerator plate 20 comprises a donut-shaped plate substantially extending horizontally and substantially filling second inner space 40. Accelerator plate 20 also includes at least one aperture 48 for the flow of fluid therethrough.

Accelerator plate 20 is only one alternative that may be used in the present invention. Again, the primary object of accelerator plate 20 is to accelerate the flow of fluid beneath accelerator plate 20 when compared to the flow of fluid above accelerator plate 20. Thus, the acceleration means used to accomplish this objective must reside within the second inner space 40, need not extend across the entire second inner space 40, and, overall, may be an accelerator of the type well known in the art. For example, a suitable acceleration means may be a small mixer which, like accelerator plate 20, prevents or inhibits the bubbles from coalescing and collapsing.

As shown in FIG. 1 and in FIG. 3 (a cross-sectional view along line 3—3 of FIG. 1), apparatus 10 also includes waste gas vent 24 and waste gas tube 26. Both waste gas vent 24 and waste gas tube 26 are positioned below upper end 42 of third tube member 16 and above bubble harvester 22. In this embodiment, waste gas vent 24 simply comprises a trap to trap rising waste gas. Waste gas tube 26 extends through second tube member 14 below the upper lip of waste gas vent 24 to capture waste gas and allow it to travel through waste gas tube 26.

Returning to FIG. 1, apparatus 10 further includes bubble harvester 22. As shown in FIG. 4, a cross-sectional view of line 4—4 of FIG. 1, harvester 22 is positioned within second inner space 40 and substantially extends from the outside of first tube member 12 to the inside of second tube member 14 while accommodating third tube member 16 therethrough. Returning to FIG. 1, harvester 22 is helix-shaped and includes upper end 50 and bottom end 52. Bottom end 52 of harvester 22 is positioned above bottom end 36 of second tube member 14 and below bottom end 30 of first tube member 12. The upper end 50 of harvester 22 is below accelerator plate 20, inlet 18, waste gas vent 24, and waste gas tube 26.

Based on the above description, the operation of the embodiment of FIG. 1 is now described. Fluid (in this example, water) is allowed to flow downward within second inner space 40 toward accelerator plate 20. Gas (in this example, oxygen) is introduced into second inner space 40 at inlet 18. Acceleration plate 20 causes an increase in velocity in the fluid and bubbles below accelerator plate 20 when compared to the flow of fluid above accelerator plate 20. The faster flowing fluid is caused by the restriction of cross-sectional area in second inner space 40 and results in the creation of downward moving jets of fluid. The downward moving fluid jets assist in maintaining a dynamic swarm of bubbles of the gas within second inner space 40. Without the jets, the bubble swarm would coalesce and/or collapse, drastically reducing the gas bubble surface area per unit volume of liquid within second inner space 40.

The bubbles continue to flow downward toward helix-shaped bubble harvester 22. Harvester 22 acts similar to a parallel plate separator in that the fluid flow is converted into a horizontal component, which results in the bubbles rising to the underside of harvester 22 above. This process removes bubbles from the fluid flow and causes the bubbles to rise upward in the opposite direction of the fluid flow along the underside of harvester 22. The centrifugal force impacted by helix-shaped harvester 22 also forces bubbles toward the center of second inner space 40. Some bubbles may be, during this process, in sufficient contact with the fluid to become dissolved in the fluid. If bubbles are not so dissolved, they enter slots 46 of third tube member 16. These fugitive bubbles of gas are thus collected in the zone of harvester 22 of apparatus 10 and conveyed by gravity up third tube member 16 and into the bubble swarm of second inner space 40.

Because less than all of the bubbles are absorbed into the fluid, bubbles are continually wasted from apparatus 10.

Excess bubbles leave apparatus 10 by being trapped by waste gas vent 24 and exit apparatus 10 by waste gas tube 26. The fluid containing dissolved gas exits apparatus 10 by flowing upward through first tube member 12.

Figure 6:
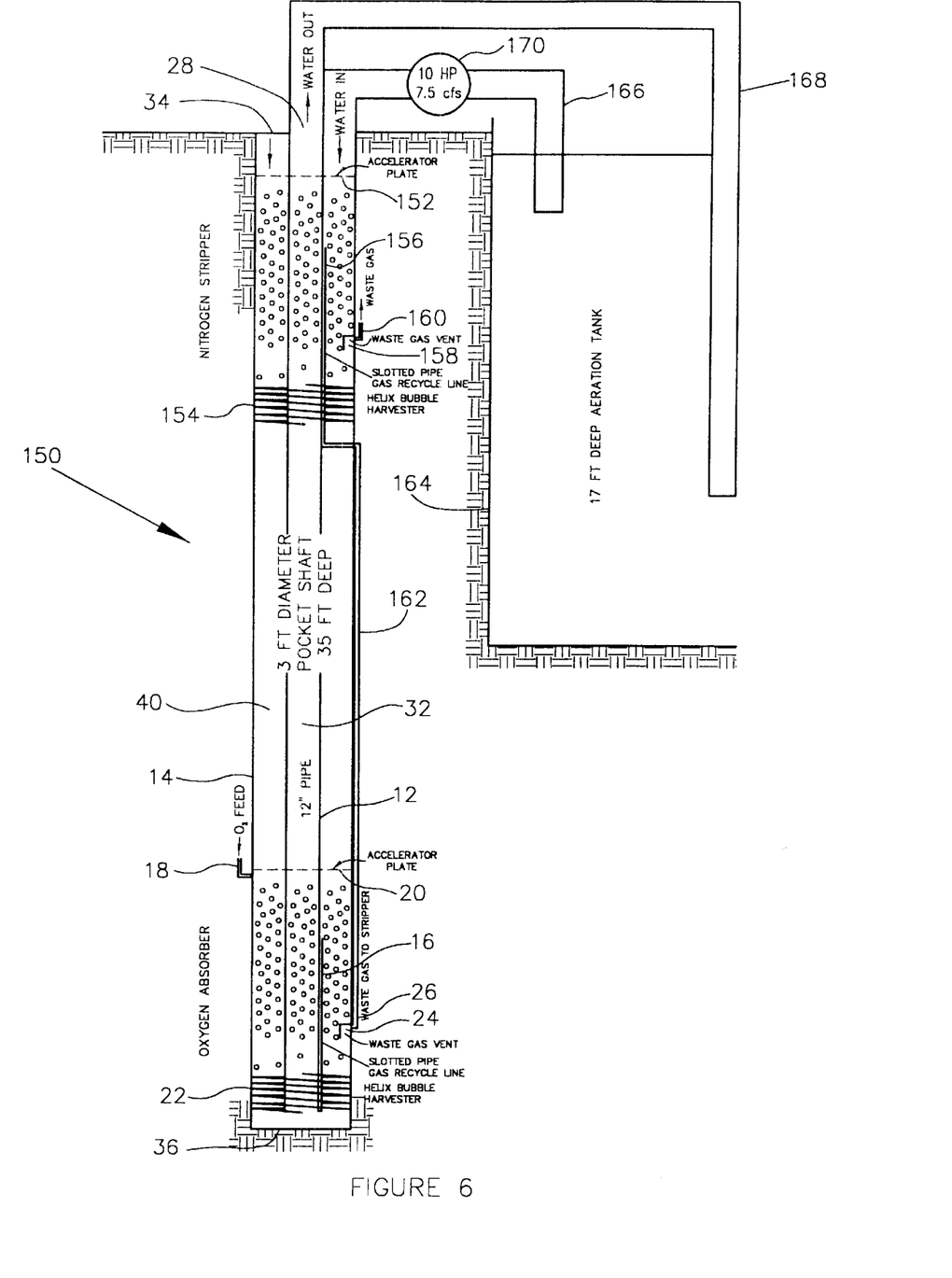
FIG. 6 shows a side view of a third embodiment of the apparatus of the present invention wherein the outer tube member is translucent to illustrate the components of the apparatus.

It will be appreciated by those of skill in the art that the gas dissolving apparatus of the present invention is comprised of few parts and of no moving parts, other than might be recognized or desired to introduce gas through inlet 18 and/or fluid through second inner space 40 (see; FIG. 6, for example). Thus, the apparatus is cost effective, both as to capital costs and costs of operation. The apparatus does not require significant maintenance. The apparatus allows large particles to freely pass through the system. Yet, it is quite capable of resulting in high nonsoluble gas absorption efficiency.

Figure 5:
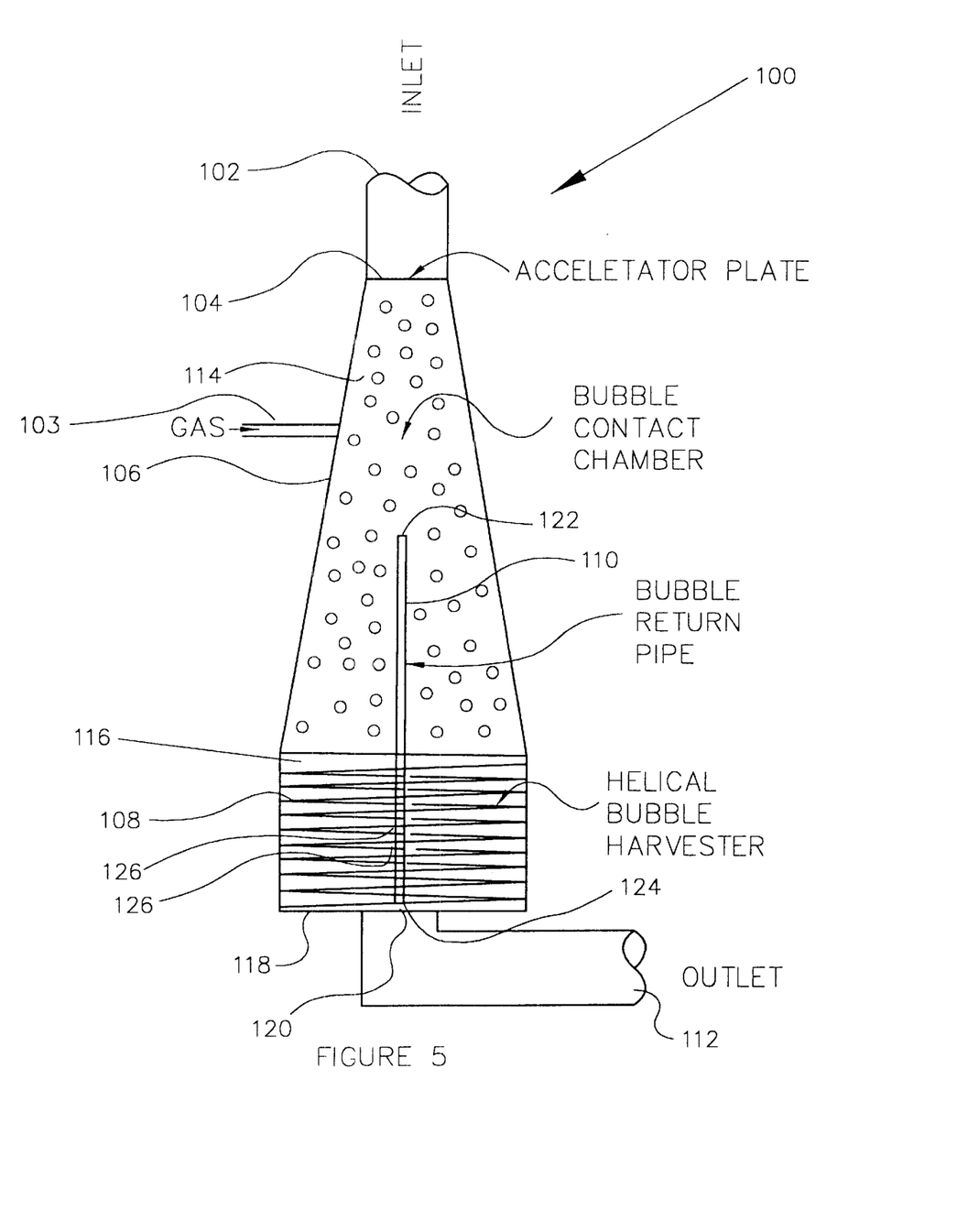
FIG. 5 shows a side view of a second embodiment of the apparatus of the present invention wherein the exterior of the apparatus is translucent to illustrate the components of the apparatus.

Referring now to FIG. 5, there is shown a side view of a second embodiment of the apparatus wherein the exterior of the apparatus is translucent to illustrate the components of the apparatus. In this embodiment, apparatus 100 includes inlet 102, dissolved gas feed 103, accelerator plate 104, bubble contact chamber 106, bubble harvester 108, bubble return tube member 110, and outlet 112. Inlet 102 serves as a means for receipt of the fluid with or without a gas therethrough. Dissolved gas feed 103 serves as a means for introduction of the gas to the fluid housed in chamber 106. Accelerator plate 104, similar to accelerator plate 20 of FIG. 1, serves to accelerate the flow of fluids and bubbles in chamber 106 when compared to the fluid flow in inlet 102.

Bubble chamber 106 is comprised of first portion 114 and second portion 116. As illustrated, first portion 114 has a diverging interior surface. Second portion 116 is substantially cylindrical and includes a bottom surface 118 having at least one aperture 120 therethrough. Aperture 120 is operatively connected to outlet 112.

Within second portion 116 of chamber 106 is harvester 108. Like harvester 22 of FIG. 1, harvester 108 is helical and, except for the accommodation of bubble return tube member 110, substantially extends across the interior of second portion 116 of chamber 106.

Bubble return tube member 110 is substantially vertical and proximate to the center axis of chamber, 106. Tube member 110, like third tube member 16 of FIG. 1, has open upper end 122, open bottom end 124, and at least one aperture 126. Apertures 126 are located proximate harvester 108 and are below the upper end of harvester 108.

As will be appreciated by those of skill in the art, the embodiment of FIG. 5 will operate in the presence of hydrostatic pressure, such as in a pump discharge. In such a configuration, there also is no need to accommodate outgassing of initially dissolved gases displaced by the absorption of the gas. Therefore, the embodiment of FIG. 3 does not contain any special components for handling waste gas.

Considering the operation of the apparatus of FIG. 5, fluid is introduced to apparatus via inlet 102 and gas is introduced via gas inlet 103. Increased jet velocity of the fluid is achieved by passage of the fluid through accelerator plate 104 in the manner described in association with accelerator plate 20 of FIG. 1. The expanded cross-section of first portion 114 of chamber 106 reduces the downward velocity of the fluid to less than or equal to that of the buoyant velocity of the bubbles of gas in the bubble swarm in chamber 106. This reduction in fluid velocity allows retention of a very high concentration of bubbles in the swarm housed in chamber 106. The configuration of chamber 106 therefore enhances gas absorption. Maintenance of prolonged bubble residence times in the bubble swarm is helpful in this regard.

As fluid and bubbles reach harvester 108 in second portion 116 of chamber 106, harvester 108 translates the fluid flow into a horizontal component which permits the bubbles to rise and attach to the underside of harvester 108, thereby removing them from the fluid flow. The bubbles then flow upward by gravity and inward due to centrifugal force in helix-shaped harvester 108. The bubbles enter apertures 126 of bubble return tube member 110 and flow upward out upper end 122 of tube member 110 into chamber 106. Thus, apparatus 100 returns fugitive bubbles to enhance efficiency by prolonging their residence times. Fluid having gas dissolved therein exits chamber 106 through aperture 120 of bottom surface 118 of chamber 106 into outlet 112.

It will be appreciated by those of skill in the art that several mechanisms contribute to the gas absorption efficiency of the apparatus of FIG. 5. The shape of chamber 106 assists in keeping bubbles in contact with the fluid for an extended period of time to enhance absorption. To dissolve oxygen in water, for example, it is desired to force contact of the bubbles with the water for as much as 100 seconds to ensure absorption. Also, the continuation of harvester 108 and bubble return tube member 110 recycle fugitive (unabsorbed) bubbles back into chamber 106. This also increases absorption efficiency.

It will also be appreciated that the exact shapes of chamber 106 need not be as illustrated in FIG. 5. For example, various angles and lengths of first portion 114 of chamber are possible. Also, second portion 116 need not be cylindrical in shape. Also, the chamber could be of unitary conical shape, unitary cylindrical shape, or any other shape reasonably able to promote the flow of fluid and the bubble swarm as described herein.

Referring now to FIG. 6, there is shown a side view of a third embodiment of the apparatus of the present invention wherein the outer tube member is translucent to illustrate the components of the apparatus. In this embodiment, apparatus 150, like apparatus 10 of FIG. 1, includes first tube member 12, second tube member 14, third tube member 16, inlet means 18, accelerator plane 20, first helix-shaped bubble harvester 22, first waste gas vent 24, and first waste gas outlet 26. This embodiment further includes second accelerator plate 152, second helix-shaped bubble harvester 154, fourth tube member 156, second waste gas vent 158, and second waste gas outlet 160. The apparatus further includes fifth tube member 162 connecting first gas tube outlet 26 to the open a bottom end of fourth tube member 156.

As will become apparent with the description of apparatus 150 below, the lower portion of apparatus 150 is primarily responsible for absorption of the gas, and the upper portion is primarily responsible for stripping an initially dissolved gas which is replaced with the absorbed gas. If used to oxygenate water, the lower portion is the oxygen absorption and the upper portion is the nitrogen stripper.

In the embodiment of FIG. 6, apparatus 150 is buried in an excavated shaft, bottom end 36 of second tube member 14 is approximately 10 feet or more below the surface of the earth. First tube member 12 is about 12 inches in diameter and second tube member 14 is about 36 inches in diameter. These dimensions are illustrative, not a necessity, and not to be limiting in any respect.

Also nearby is tank 164 having the fluid therein. Tank outlet means 166 extends into the fluid residing in tank 164 and is operatively connected to upper end 34 of second tube member 14. Tank inlet means 168 extends into the fluid residing in tank 164 and is operatively connected to upper end 28 of first tube member 12. To initiate and/or maintain flow of fluid from tank 164 through tank outlet means 166 into apparatus 150, pump means 170 is shown.

Now, turning to the operation of apparatus 150, fluid is pumped from. tank 164 through tank outlet means 166 into upper end 34 of second tube member 14. In one embodiment, the velocity of fluid entering upper end 34 of tube member 14 is approximately 0.5 ft/sec to 2.0 ft/sec. The fluid passes through second accelerator plate 152. Second accelerator plate 152 restricts the cross-sectional area for fluid flow and includes apertures (see FIG. 2) to cause the fluid to accelerate into downward jets. In one embodiment, the downward jets of fluid move at approximately 6 ft/sec to 12 ft/sec. The increased velocity jets maintain a dynamic bubble swarm in the upper portion of apparatus 150. The rise velocity of the bubbles in this upper portion (only about 0.5 ft/sec to 1 ft/sec in one embodiment) is low enough so that most of the bubbles accumulate and remain in the dynamic bubble swarm. The gas fed into the upper portion originates from first waste gas vent through first waste gas tube 26 as described below. As the gas bubbles accumulate in second inner space 40 in this upper portion of apparatus 150, they are crowded downward and are eventually lost as the bubble swarm is pushed below second waste gas vent 158 to enter second waste gas tube 160.

At the upper portion of apparatus 150, as fluid flows downward through the bubble swarm the gas (introduced at inlet means 18 originally) is dissolved into the fluid and a gas already dissolved in the fluid is stripped out of the fluid into the gas phase. Fugitive bubbles which get inadvertently dragged out of the bubble swarm must be efficiently captured and returned to the bubble swarm. This is accomplished with second helix-shaped bubble harvester 154 and fourth tube member 156 in a manner as previously described in association with comparable components shown in FIGS. 1 and 5.

Fluid, devoid of fugitive bubbles, continues downward from the bottom of second harvester 154 toward first accelerator plate 20. In one embodiment, the velocity of the fluid in this area is about 0.5 ft/sec to 2.0 ft/sec. The operation of the device is, at this point, as described in association with apparatus 10 of FIG. 1

Because less than all of the gas is absorbed in the lower portion of apparatus 150, some bubbles are continually wasted from the system through waste gas vent 24 into first waste gas tube 26, through fifth tube member 162 into fourth tube member 156. These bubbles are then processed as described above for eventual exit from the system via second waste gas vent 158 and second waste gas tube 160. Of course, fluid containing dissolved gas and devoid of bubbles exits the bottom of first harvester 22 and flows upward through first tube member 12, through tank inlet means 168, into tank 164.

It will be appreciated by those of skill in the art that the embodiment of FIG. 6 reduces the extraneous gas (gas initially dissolved in the fluid) in the system to enhance absorption of the gas. The extraneous gas is reduced before the gas dissolver. It will also be appreciated that, although shown as installed in an excavation, the apparatus of FIG. 6 need not be so installed. Instead, apparatus 150 may be placed in a tube or directly into the fluid.

Figure 7:
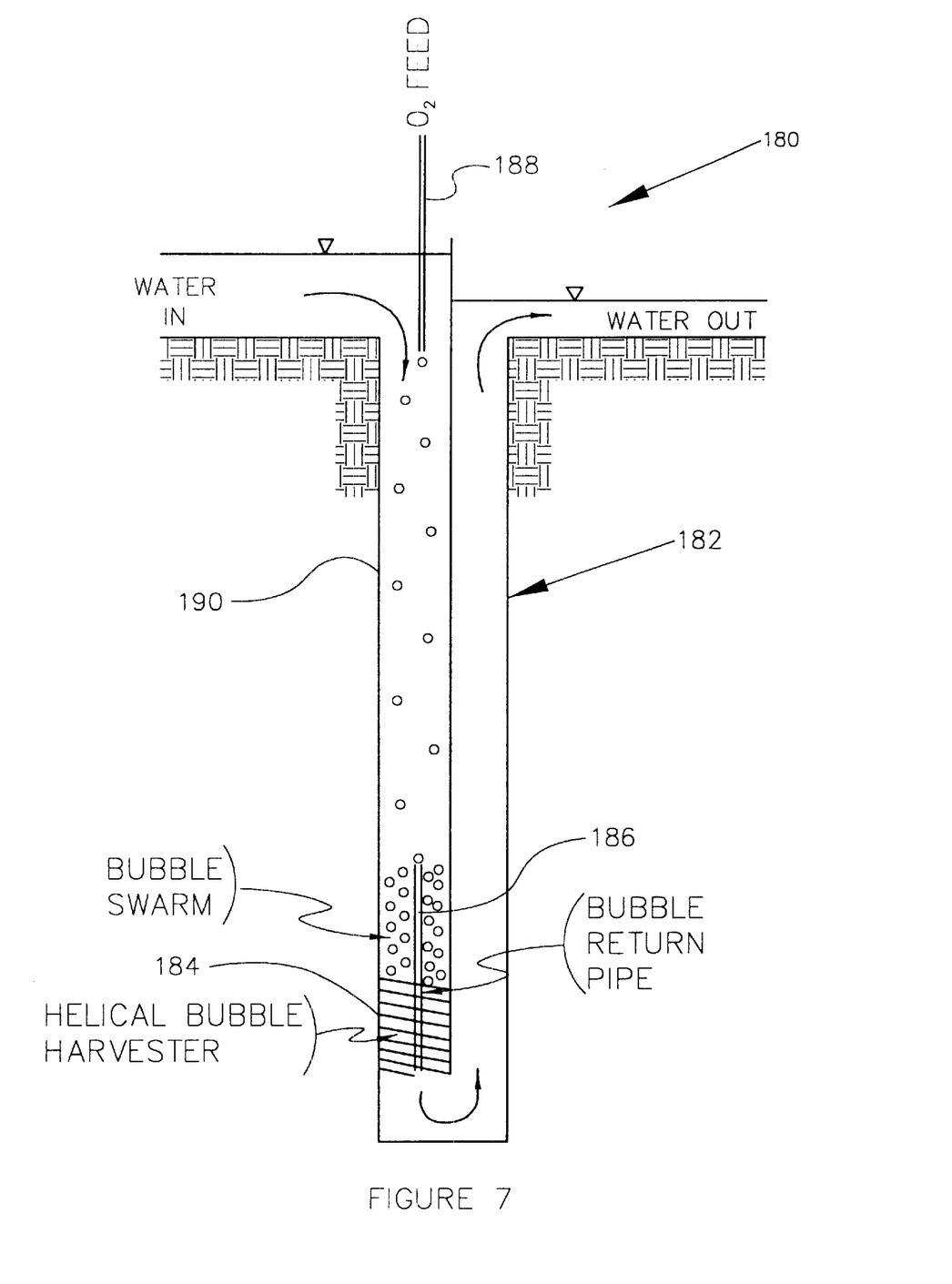
FIG. 7 shows a side view of a fourth embodiment of the apparatus of the present invention wherein the tube member is translucent to illustrate the components of the apparatus.

Referring now to FIG. 7, there is shown a fourth embodiment of the present invention wherein U-tube member 190 of the apparatus is translucent to illustrate the components of the apparatus. U-tube member 190 has an inlet side and an outlet side. In this embodiment, apparatus 180 comprises a conventional U-tube oxygenator 182, a helical bubble harvester 184, and a bubble return pipe (tube member) 186. Harvester 184 is similar to the bubble harvesters of FIGS. 1, 5, and 6 and bubble return pipe 186 is similar to those of FIGS. 1, 5, and 6.

Fluid enters apparatus 180 on the inlet side of U-tube member 190. U-tube oxygenator 182 includes inlet 188 for introduction of the gas (such as oxygen) to be dissolved into the fluid (such as water) housed in U-tube member 190. In one alternative of this embodiment of the present invention, inlet 188 is vertically oriented and extends through the inlet side of U-tube member 190. In this embodiment, harvester 184 is placed proximate the bottom of the inlet side of the U-tube member 190.

During operation of apparatus 180, harvester 184 and bubble return pipe 186 serve the same functionality as described in association with the embodiments of FIGS. 1, 5, and 6. Specifically, as the fluid and bubbles move down the inlet side of the U-tube member 190, undissolved (fugitive) bubbles flow upward against the underside of harvester 184. During this process, some bubbles may be in sufficient contact with the fluid to become dissolved in the fluid. If the bubbles are not so dissolved, they then flow into the apertures of bubble return pipe 186 to be returned to the bubble swarm above harvester 184. Exiting out the outlet side of U-shaped tube member 190 is the fluid containing a high concentration of dissolved gas and devoid of bubbles.

With regard to the embodiment of FIG. 7, it will be appreciated by those of skill in the art that use of harvester 184 to capture bubbles results in a more efficient transfer of gas into the fluid. As a result, the U-tube apparatus does not have to be as deep as a conventional U-tube apparatus to achieve the same absorption levels.

It will be appreciated by those of skill in the art that the present invention solves several shortcomings of the prior art and can be used to dissolve soluble and insoluble gases. The apparatus manages the dissolved gases initially present in the fluid and displaced by the dissolved gas. The apparatus provides a high bubble area per volume of fluid to result in a high reduction in dissolved gas deficit. Fugitive bubbles are effectively separated to increase the percentage absorption efficiency of the gas. Hydrostatic pressurization rather than mechanical pressurization is used for dissolving the gas, thereby reducing operational costs. Also, gas is fed into a pressurized fluid chamber without the necessity of equal pressure from a PSA generator.

It will also be appreciated that the harvester and bubble return pipe of the present invention may be used in any container containing fluid, and need not be vertically oriented as illustrated in FIGS. 1, 5, 6, and 7. Instead, the harvester/bubble return pipe may be used to capture bubbles from any fluid flowing in a pipe or conduit (or other container). Further, the harvester/bubble return pipe combination is useful whether or not any gas is to be dissolved into the fluid.

It will be further appreciated that the use of the harvester/ bubble return pipe combination can reduce the cross-section and/or depth of bubble contactor of any apparatus in which it is used. Such reductions result in a lower cost of the apparatus and any cost of excavation of the apparatus, if applicable.

It will be still further appreciated that the apparatus of the present invention has use in a myriad of applications. In oxygenation of water for example, the present invention may be used for slowly moving rivers and canals, lagoons, reservoirs, fish/shellfish/mussel ponds, wastewater treatment systems, sewer lift stations, and wastewater processing for various industries; including but not limited to the pharmaceutical, petroleum, and chemical industries. The present invention is also useful for dissolving hydrogen into vegetable oil, hydrogen into coal liquifaction fluids, or for pharmaceutical and industry aerobic bioprocesses, such as yeast production and Vitamin C production. The present invention also has application for ozonation of water or other fluids, dissolving xenon into fluids for injecting into the body, and supersaturating eye-wash liquids with D.O.

The foregoing is offered primarily for purposes of illustrating the apparatus and method of the present invention. It will be readily apparent to those of skill in the art that the materials, dimensions, operating procedures and conditions, and other parameters of the gas dissolving apparatus and method may be further modified or substantiated in various ways without departing from the spirit and scope of the invention.

I claim:

1. An apparatus for dissolving a gas into a fluid, the apparatus comprising:
    a U-shaped tube having an inlet side for introduction of the fluid and the gas therethrough, and having an outlet side for release of fluid having the gas dissolved therein;
    a helix-shaped bubble harvester having a longitudinal axis and located in the inlet side of the U-shaped tube; and
    a bubble return tube located proximate the longitudinal axis of the helix-shaped bubble harvester and having at least one aperture therethrough.

2. The apparatus of claim 1, further comprising a vertically oriented gas feed tube extending through the inlet side of the U-shaped tube for the introduction of the gas into the fluid.

3. The apparatus of claim 1, wherein the fluid comprises water.

4. The apparatus of claim 3, wherein the gas comprises oxygen.

5. The apparatus of claim 3, wherein the fluid further comprises dissolved nitrogen gas.

6. A method for dissolving a gas into a fluid, the method comprising the steps of:
    providing the apparatus of claim 1;
    introducing the fluid and the gas through the inlet side of the U-shaped tube;
    allowing the fluid to flow downward through the inlet side of the U-shaped tube, such that bubbles of gas travel downward to the helix-shaped bubble harvester where a portion of the bubbles are kept in contact with the fluid for dissolving at least a portion of the bubbles into the fluid; and
    allowing the fluid containing the dissolved gas to flow upward through the outlet side of the U-shaped tube.

7. The method of claim 6, further comprising the step of:
    allowing the portion of the bubbles not dissolved into the fluid at the helix-shaped bubble harvester to travel through the at least one aperture of the bubble return tube for re-entry into the inlet side of the U-shaped tube above the helix-shaped bubble harvester.

8. A method for dissolving a gas into a fluid, the method comprising the steps of:
    providing the apparatus of claim 2;
    introducing the fluid through the inlet side of the U-shaped tube;
    introducing the gas through the gas feed tube;
    allowing the fluid to flow downward through the inlet side of the U-tube member, such that bubbles of gas travel downward to the helix-shaped bubble harvester where a portion of the bubbles are kept in contact with the fluid for dissolving the bubbles into the fluid; and
    allowing the fluid containing the dissolved gas to flow upward through the outlet side of the U-shaped tube.

9. The method of claim 8, further comprising the step of:
    allowing the portion of the bubbles of gas not dissolved into the fluid at the helix-shaped bubble harvester to travel through the at least one aperture of the bubble return tube for re-entry into the inlet side of the U-shaped tube above the helix-shaped bubble harvester.

* * * * *